(12) United States Patent
Uehara et al.

(10) Patent No.: US 12,716,789 B2
(45) Date of Patent: Aug. 25, 2026

(54) DETECTION DEVICE

(71) Applicant: Japan Display Inc., Tokyo (JP)

(72) Inventors: Toshinori Uehara, Tokyo (JP); Fumihoru Nakano, Tokyo (JP)

(73) Assignee: Japan Display Inc., Tokyo (JP)

( * ) Notice: Subject to any disclaimer, the term of this patent is extended or adjusted under 35 U.S.C. 154(b) by 349 days.

(21) Appl. No.: 18/517,423

(22) Filed: Nov. 22, 2023

(65) Prior Publication Data

US 2024/0183723 A1 Jun. 6, 2024

(30) Foreign Application Priority Data

Dec. 5, 2022 (JP) ................................ 2022-193954

(51) Int. Cl.

| | |
|---|---|
| ***G01L 1/14*** | (2006.01) |
| ***G01B 7/16*** | (2006.01) |
| ***G01B 7/293*** | (2006.01) |
| ***G01L 25/00*** | (2006.01) |

(52) U.S. Cl.

CPC .................. *G01L 1/14* (2013.01); *G01B 7/22* (2013.01); *G01B 7/293* (2013.01); *G01L 25/00* (2013.01)

(58) Field of Classification Search

CPC .. G01L 1/14; G01L 25/00; G01B 7/22; G01B 7/293

See application file for complete search history.

(56) References Cited

U.S. PATENT DOCUMENTS 7,814,801 B2 * 10/2010 Inamori .................. G01B 7/20 73/849
9,612,102 B2 * 4/2017 Reese .................... G06F 3/016
9,766,762 B2 * 9/2017 Salo ...................... G06F 3/0487
10,197,459 B2 * 2/2019 Keller ..................... G01L 1/146
10,285,618 B2 * 5/2019 Nebuya ................ A61B 5/6831
11,457,832 B2 * 10/2022 Nebuya ................ A61B 5/0536
11,744,512 B2 * 9/2023 Dietz .................. A61B 5/4566 324/661
12,220,224 B2 * 2/2025 Ottley ...................... G01D 5/24
2020/0378741 A1 * 12/2020 Dietz ....................... G01B 7/28
2021/0404888 A1 * 12/2021 He ........................... G01L 1/22
2025/0003729 A1 * 1/2025 Uehara .................... G01B 7/18
2025/0164231 A1 * 5/2025 Nakano .................. G01B 7/293

FOREIGN PATENT DOCUMENTS

JP S60067804 A 4/1985
JP H0280902 A 3/1990

* cited by examiner

*Primary Examiner* — Freddie Kirkland, III

(74) *Attorney, Agent, or Firm* — K&L Gates LLP

(57) ABSTRACT

Disclosed herein is a detection device including a sensor substrate including strain sensors arranged on a rectangular flexible substrate at fixed intervals in a longitudinal direction. A curvature radius between a pair of adjacent strain sensors is calculated on a value from a preceding strain sensor of the pair of adjacent sensors. When a start point node is defined as a position of a first strain sensor at one end of the strain sensors, a relative position of each of the strain sensors is determined by sequentially adding the relative positions. When the first and second strain sensors overlap, positions of the first and second strain sensors are considered identical on relative space. A position of each strain sensor is corrected based on a difference between a calculated position of the second strain sensor determined by sequentially adding the relative positions and actual position of the second strain sensor.

14 Claims, 12 Drawing Sheets

DETECTION DEVICE

CLAIM OF PRIORITY

The present application claims priority from Japanese Patent Application JP 2022-193954 filed on Dec. 5, 2022, the content of which is hereby incorporated by reference into this application.

BACKGROUND OF THE INVENTION

1. Field of the Invention

The present disclosure relates to a detection device, and is particularly applicable to a detection device including a plurality of strain gauges.

2. Description of the Related Art

There are available measuring detectors that each use a plurality of strain gauges in order to measure a target to be measured such as an object or a human body. Proposals for such measuring detectors include Japanese Patent Laid-Open No. Sho60-67804 and Japanese Patent Laid-Open No. Hei2-80902.

A case will be considered in which a curved surface of an annular measurement target is measured by use of a sensor array sheet including a plurality of nodes that measures a curvature radius and strain gauges each disposed at a respective one of the nodes. In this case, a particular node of the sensors is used as a start point to sequentially calculate a coordinate value of an adjacent node. At this time, the curvature radius involves a measurement error, and thus, as a distance from the calculation start point to the node of interest increases, the sequential calculation accumulates errors, leading to a mismatch between a calculated coordinate value and a true value. Accordingly, the accumulated error in each coordinate point leads to a misalignment between the "coordinate point of a start point node (start point coordinate point)" and the "coordinate point of an end point node or an end point (end point coordinate point)," which are otherwise aligned with each other.

An object of the present disclosure is to provide a detection device that can match the coordinate point of the start point with the coordinate point of the end point.

Other problems and new features will be clear from the description of the specification and the accompanying drawings.

SUMMARY OF THE INVENTION

Typical aspects of the present disclosure will be described below in brief.

According to an embodiment, a detection device including a sensor substrate including a plurality of strain sensors arranged on a rectangular flexible substrate at fixed intervals in a longitudinal direction of the flexible substrate, in which a curvature radius between a pair of adjacent strain sensors among the plurality of strain sensors is calculated on a basis of a value from a preceding strain sensor of the pair of adjacent sensors, when a start point node is defined as a position of a first strain sensor at one end of the plurality of strain sensors, a relative position of each of the plurality of strain sensors is determined by sequentially adding the relative positions, starting with the first strain sensor of the start point node on a basis of the curvature radius between adjacent strain sensors, when the first strain sensor of the start point node overlaps with a second strain sensor at an nth node, a position of the first strain sensor and a position of the second strain sensor are considered to be identical on a relative space, and a position of each strain sensor is corrected on a basis of a difference between a calculated position of the second strain sensor determined by sequentially adding the relative positions and an actual position of the second strain sensor.

Additionally, according to an embodiment, a detection device including a sensor substrate including a plurality of strain sensors arranged on a rectangular flexible substrate at fixed intervals in a longitudinal direction of the flexible substrate, in which a curvature radius between each pair of adjacent strain sensors among the plurality of strain sensors is calculated on a basis of a value from a preceding strain sensor of the pair of adjacent strain sensors, when a start point node is defined as a position of a first strain sensor at one end of the plurality of strain sensors, a relative position of each of the plurality of strain sensors is determined by sequentially adding the relative positions, starting with the first strain sensor of the start point node on a basis of the curvature radius between adjacent strain sensors, when a predetermined position, on the flexible substrate, of the first strain sensor of the start point node overlaps with a first position on the flexible substrate between a second strain sensor at an nth node and a third strain sensor at an n+1th node, a position of the first strain sensor and the first position are considered to be identical on a relative space, and a position of each strain sensor is corrected on a basis of a difference between a calculated position of the first position determined by sequentially adding the relative positions and an actual position of the first position.

DETAILED DESCRIPTION OF THE PREFERRED EMBODIMENTS

Each embodiment of the present disclosure will be described below with reference to the drawings. Note that the disclosure is only an example and that the scope of the present disclosure includes embodiments variations of which can be easily devised by those skilled in the art while maintaining the spirits of the disclosure. Additionally, to make the description clearer, the drawings are schematically made in terms of the width, thickness, shape, and the like of each portion. However, the drawings are only illustrative and are not intended to limit the interpretation of the present disclosure. In addition, in the specification and each figure, elements previously described with reference to corresponding figures are denoted by the same reference signs, and detailed description of the elements may be omitted as appropriate.

Embodiments (Configuration Example of Sensor Array Sheet)

Figure 1:
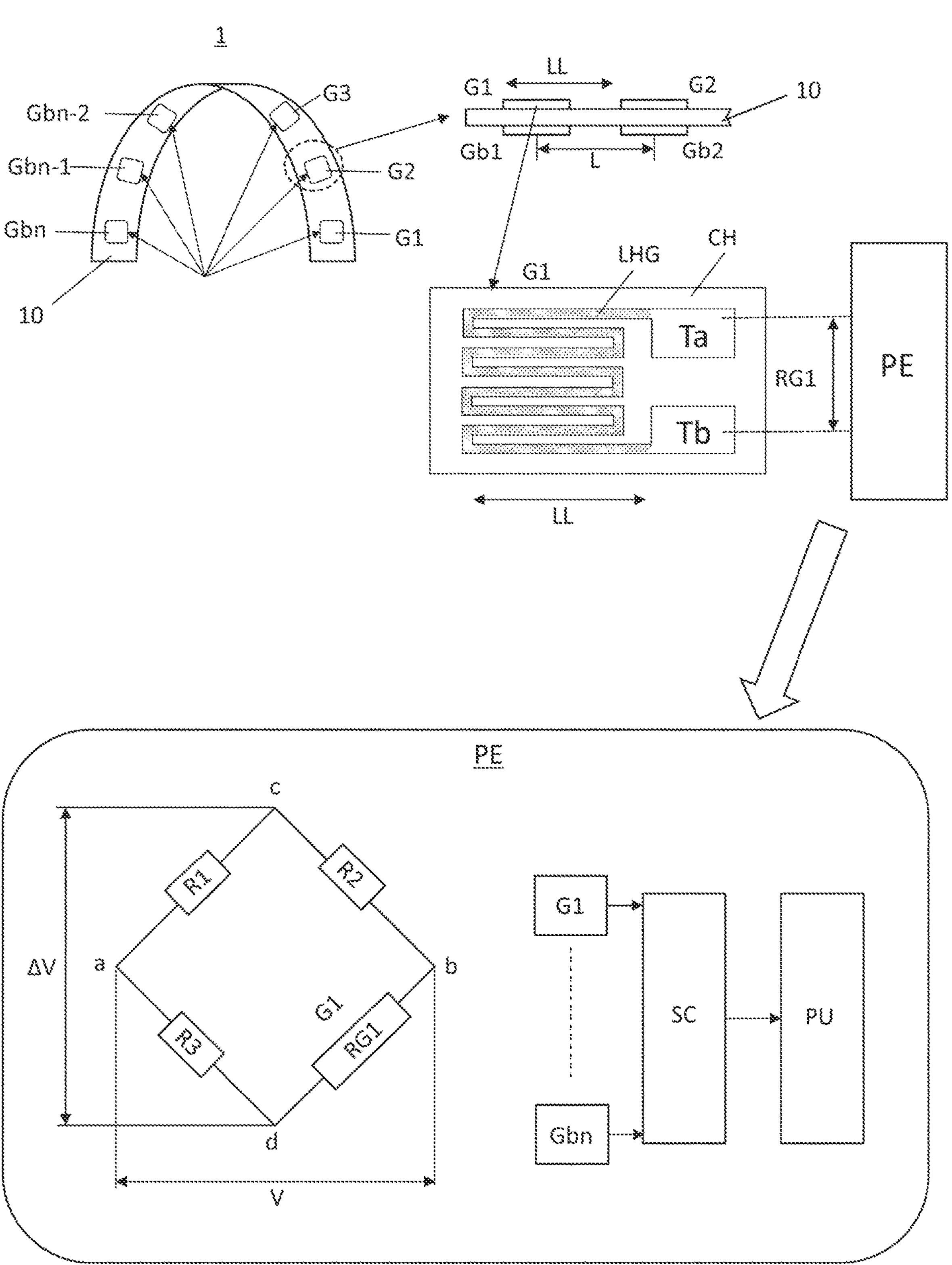
FIG. 1 is a diagram illustrating a sensor array sheet according to an embodiment.

First, FIG. 1 is used to describe a configuration example and a purpose of a sensor array sheet including a strain gauge disposed in each node as a sensor. FIG. 1 is diagram for describing the sensor array sheet according to an embodiment.

As illustrated in FIG. 1, a sensor array sheet 1 includes a sensor substrate including a plurality of strain gauges G (G1, G2, G3, . . . , Gn, Gb1, . . . , Gbn-2, Gbn-1, and Gbn) arranged on a resin sheet, for example, a rectangular flexible substrate 10 in a longitudinal direction LL as sensors. The plurality of strain gauges G1, G2, G3, . . . , and Gn are disposed on a front surface side (first surface side) of the flexible substrate 10 at fixed intervals (here, intervals L). Additionally, the plurality of strain gauges Gb1, . . . , Gbn-2, Gbn-1, and Gbn are disposed on a back surface side (second surface side) at fixed intervals (here intervals L). The strain gauges can be rephrased as strain sensors.

In this example, the strain gauge G1 is disposed on the front surface side of the sensor array sheet 1, and the strain gauge Gb1 is disposed at a position corresponding to the strain gauge G1 on the back surface side of the sensor array sheet 1. Similarly, the strain gauges Gn−1 and Gn are disposed on the front surface side of the sensor array sheet 1, and the strain gauges Gbn−1 and Gbn are disposed at respective positions corresponding to the strain gauges Gn−1 and Gn on the back surface side of the sensor array sheet 1. By disposing the sensor array sheet 1 as described above along a curved surface of an annular measurement target, the curved surface of the measurement target can be measured. In other words, the sensor array sheet 1 includes a plurality of nodes that each measure the curvature radius, and the strain gauge G is disposed in each of the nodes as a sensor.

As illustrated by the strain gauge G1 as a representative, each strain gauge includes a pair of connection terminals Ta and Tb and strain gauge wiring LHG on a semiconductor substrate CH, the strain gauge wiring LHG being provided between the connection terminal Ta and the connection terminal Tb. The strain gauge wiring LHG includes wiring folded back a plurality of times in the longitudinal direction LL. The strain gauge wiring LHG expands or contracts in the longitudinal direction LL to vary a resistance value RG1 of the strain gauge wiring LHG.

A variation in the resistance value RG1 is adapted to be able to be detected by an arithmetic device PE electrically connected to the connection terminals Ta and Tb via metal wiring and the like. In other words, the plurality of strain gauges G can be used to extract only bending stress of the sensor array sheet 1 in the longitudinal direction LL.

The arithmetic device PE includes a select circuit SC electrically connected to the plurality of strain gauges (G1, G2, G3, . . . , Gbn−2, Gbn−1, and Gbn), and a processor device PU electrically connected to the select circuit SC. The select circuit SC is configured to controllably cause one of the plurality of strain gauges G to be selectively connected to the processor device PU to allow detection of a variation in the resistance value (RG) of the strain gauge wiring LHG of the strain gauge G to which the processor device PU is connected. The select circuit SC is configured to, for example, sequentially select one of the plurality of strain gauges (G1, G2, G3, . . . , Gbn−2, Gbn−1, and Gbn) one by one. Note that the select circuit SC may be configured to select the plurality of strain gauges (G1, G2, G3, . . . , Gbn−2, Gbn−1, and Gbn) at one time to detect a variation in the resistance value (RG) of each strain gauge G from all of the plurality of strain gauges G.

As illustrated by the strain gauge G1 as a representative, the processor device PU detects a variation in the resistance value RG1 of the strain gauge G1 using a bridge including three resistance elements (resistance values are R1, R2, and R3) and the strain gauge G1. In other words, a voltage V is applied between points "a" and "b" of the bridge, and a voltage difference ΔV between points "c" and "d" of the bridge is measured. The resistance values R1, R2, and R3 and the resistance value RG1 of the strain gauge G1 are identical in a linear state in which no strain occurs in the sensor array sheet 1 (R1=R2=R3=RG1). Conversely, when strain occurs in the sensor array sheet 1, the resistance values R1, R2, and R3 differ from the resistance value RG1 of the strain gauge G1 (the resistance values R1, R2, and R3 are greater than the resistance value RG1 (R1=R2=R3>RG1) or smaller than the resistance value RG1 (R1=R2=R3<RG1). Thus, the voltage difference ΔV varies, allowing a strain occurring in the strain gauge G1 to be measured on the basis of the resistance value RG1. This allows the curved surface of the annular measurement target to be measured.

(Curved Surface Reconstruction Calculation Method According to Curvature Radius 1)

Figure 2:
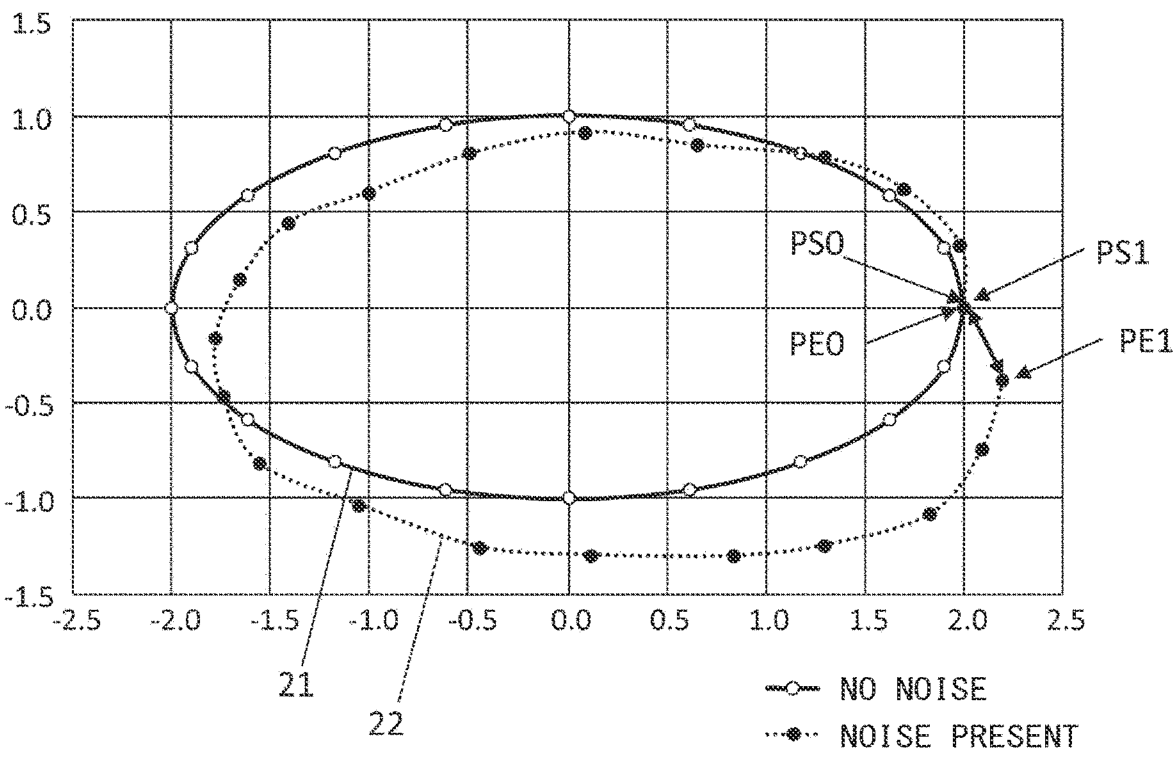
FIG. 2 is a diagram for describing a purpose.
Figure 3:
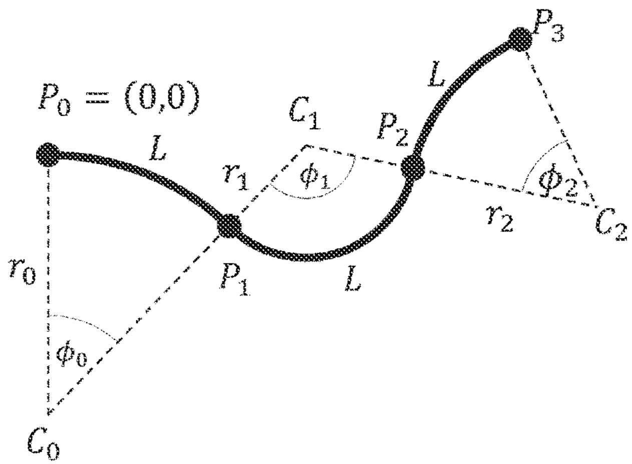
FIG. 3 is a diagram for describing curved surface reconstruction according to a curvature radius.
Figure 4:
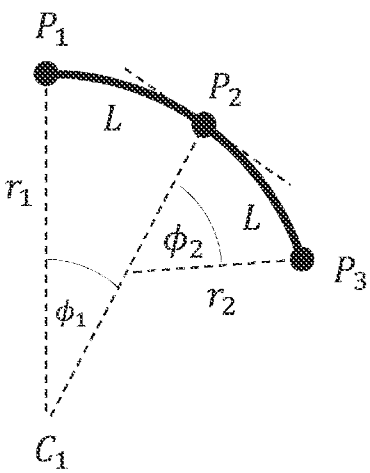
FIG. 4 is a diagram for describing a case where a curvature radius $r_n$ and a curvature radius $r_{n+1}$ have an equal sign.
Figure 5:
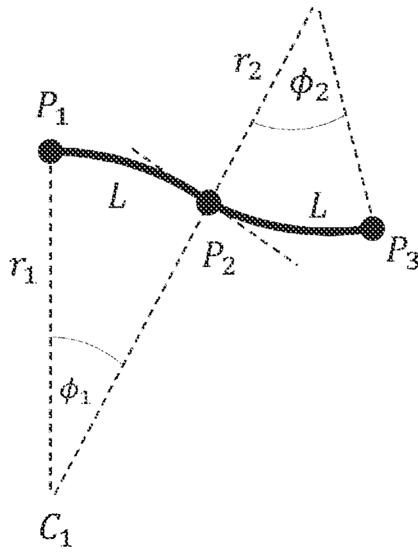
FIG. 5 is a diagram for describing a case where the curvature radius $r_n$ and the curvature radius $r_{n+1}$ have different signs.

Now, a curved surface reconstruction calculation method according to a curvature radius will be described with reference to FIGS. 2, 3, 4, and 5. FIG. 2 is a diagram for describing a purpose. FIG. 3 is a diagram for describing curved surface reconstruction according to the curvature radius. FIG. 4 is a diagram for describing a case where a curvature radius $r_n$ and a curvature radius $r_{n+1}$ have an equal sign. FIG. 5 is a diagram for describing a case where the curvature radius $r_n$ and the curvature radius $r_{n+1}$ have different signs.

In FIG. 3, the strain gauges are assumed to be disposed at fixed intervals L. The curvature radius between each pair of adjacent strain sensors can be calculated on the basis of a value from the preceding one of the pair of adjacent strain sensors. Here, $r_n$ denotes the curvature radius, and the clockwise direction is assumed to indicate a positive sign, whereas a counterclockwise direction is assumed to indicate a negative sign. L denotes the length of an arc and is assumed to be constant. Φn denotes the angle of an arc, and the clockwise direction is assumed to indicate a positive sign, whereas the counterclockwise direction is assumed to indicates a negative sign. $P_n$ denotes a curved surface coordinate value. $C_n$ denotes the center coordinate value of the curvature radius and can be set by a user. A vector $(C_nP_n)$ represents a vector from the point of the center coordinate value $C_n$ of the curvature radius to the point of the curved surface coordinate value $P_n$.

The length of an arc is constant, and thus the curvature radius determines the angle of the arc (Expression 1)

$$\Phi n = L/r_n \quad \text{(Expression 1)}$$

A parameter for a start point node of the strain gauge G1 is defined as follows.

$$P_0=(0,0)C_0=(0,r_0)$$

The curved surface coordinate value $P_{n+1}$ of the next node is determined by rotating the vector $(C_nP_n)$ by a two-dimensional rotation matrix R (Φn) (Expression 3) by use of the arc angle Φn (Expression 2).

$$\text{Vector } (C_{n+1}P_{n+1})=R((\Phi n)^*\text{vector } (C_nP_n) \quad \text{(Expression 2)}$$

[Math. 1]

$$R(\phi_n) = \begin{pmatrix} \cos\phi_n & -\sin\phi_n \\ \sin\phi_n & \cos\phi_n \end{pmatrix}$$

Here, the arc is assumed to connect smoothly at the curved surface coordinate value $P_{n+1}$. That is, at the curved surface coordinate value $P_{n+1}$, a normal vector $(C_nP_{n+1})$ and a normal vector $(C_{n+1}P_{n+1})$ of the arc have an equal inclination, and the magnitudes of the normal vector $(C_nP_{n+1})$ and the normal vector $(C_{n+1}P_{n+1})$ correspond to the ratio between the normal vectors. Therefore, the parameter for the next node is defined as follows.

$$\text{Vector } (C_{n+1}P_{n+1}) = \big((r_{n+1})/(r_n)\big) * (\text{vector}(C_nP_{n+1})) = \big((r_{n+1})/(r_n)\big) * R(\Phi n) * \text{vector } (C_nP_n)$$

Here, the definition of the curvature radius includes the positive sign and the negative sign. The curvature radius $r_n$ and the curvature radius $r_{n+1}$ having an equal sign means that the normal vector $(C_nP_{n+1})$ and the normal vector $(C_{n+1}P_{n+1})$ have the same orientation of the normal vector of the arc (see FIG. 4). On the other hand, the curvature radius $r_n$ and the curvature radius $r_{n+1}$ having different signs means that the normal vector $(C_nP_{n+1})$ and the normal vector $(C_{n+1}P_{n+1})$ have opposite orientations of the normal vector of the arc (see FIG. 5).

In other words, when a start point node is assumed to be the position of the first strain sensor G1 at one end of the plurality of strain sensors G, the relative position of each of the plurality of strain sensors G is determined by sequentially adding the relative positions starting with the first strain sensor G1 corresponding to the start point node on the basis of the curvature radius r between the adjacent sensors.

At this time, the curvature radius involves a measurement error, and thus, as the distance from the calculation start point to the node of interest increases, the sequential calculation accumulates errors (noise), leading to a mismatch between a calculated coordinate value and a true value. Accordingly, as illustrated by a line 22 as "NOISE PRESENT" in FIG. 2, a misalignment occurs between the "coordinate point of a start point node (start point coordinate point) PS1" and the "coordinate point of an end point node or the coordinate point of an end point (end point coordinate point) PE1," which are otherwise aligned with each other. A line 21 illustrated as "NO NOISE" in FIG. 2 indicates a state in which no misalignment occurs between the "coordinate point of the start point node (start point coordinate point) PS0" and the "coordinate point of the end point node or the coordinate point of the end point (end point coordinate point) PE0."

Accordingly, correction calculation needs to be performed in which calculation errors are corrected by matching the start point node (coordinate point of the start point node (start point coordinate point)" with the end point node "coordinate point of the end point node or the coordinate point of the end point (end point coordinate point)."

(Curved Surface Reconstruction Calculation Method According to Curvature Radius 2)

Figure 6:
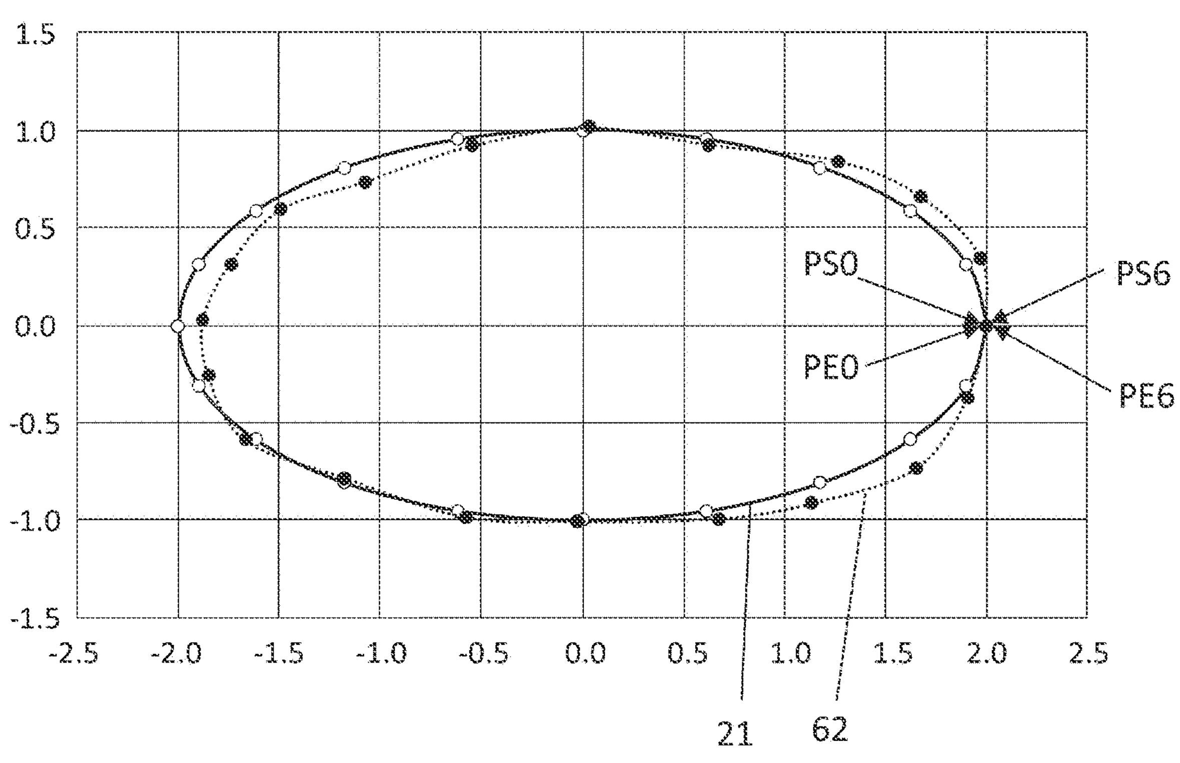
FIG. 6 is a diagram for describing the use of a correction calculation method for correcting calculation errors.

Now, a correction calculation method for improving calculation errors will be described. FIG. 6 is a diagram for describing the use of the correction calculation method for improving calculation errors. As in FIG. 2, a line 21 illustrated as "NO NOISE" in FIG. 6 indicates a state in which no misalignment occurs between the "coordinate point of the start point node (start point coordinate point) PS0" and the "coordinate point of the end point node or the coordinate point of the end point (end point coordinate point) PE0." In FIG. 6, a line 62 illustrated as "NOISE PRESENT AND CIRCULAR CORRECTION" indicates a state in which circular correction is used to improve a misalignment between the "coordinate point of the start point node (start point coordinate point) PS6" and the "coordinate point of the end point node or the coordinate point of the end point (end point coordinate point) PE6."

$x_m$ is defined as a difference in coordinate value between a curved surface node m−1 and a curved surface node m determined in accordance with the calculation of the curved surface reconstruction calculation method based on the curvature radius. By definition, the coordinate value $P_n$ of the node n is determined in accordance with (Expression 4) below by integration of $x_m$.

[Math. 2]

$$P_n = P_0 + \sum_{m=1}^{n} x_m \quad \text{(Expression 4)}$$

Here, in the actual space, the coordinate values of the start point $X_0$ and the end point $X_N$ are assumed to be aligned with each other. When C is defined as the misalignment between the start point $X_0$ and the end point $X_N$ in the calculation results for the curved surface nodes, (Expression 5) below is given.

[Math. 3]

$$P_N - P_0 = C = \sum_{m=1}^{N} x_m \neq (0, 0) \qquad \text{(Expression 5)}$$

To correct the misalignment C of the end point coordinate value, a value δ (delta) obtained by dividing the misalignment C by the total number N of $x_m$s (δ=C/N) is subtracted from each $x_m$ (Expression 6). This calculation distributes the misalignment C of the end point coordinate value among the nodes of the curved surface. In other words, the correction calculation method for improving calculation errors distributes the misalignment C of the end point coordinate value among the nodes to correct the misalignment C between the coordinate value of the start point and the coordinate value of the end point. In other words, correction is performed by dividing the misalignment C of the end point coordinate value by the number of arcs N between the first strain sensor G1 and the second strain sensor Gn, and subtracting the resultant value (δ=C/N) from each node.

[Math. 4]

$$P'_n = \sum_{m=1}^{n} (x_m - \delta) \qquad \text{(Expression 6)}$$

When the $P'_N$ determined by the above-described processing is reused in (Expression 7) below as a curved surface coordinate value, the coordinate value of the start point matches with the coordinate value of the end point, and the misalignment between the coordinate values of the nodes of the curved surface is corrected. In the specification, circular correction refers to a correction method for distributing the misalignment C of the end point coordinate value across the nodes to correct the misalignment C between the coordinate value of the start point and the coordinate value of the end point.

[Math. 5]

$$P'_N = \sum_{m=1}^{N} (x_m - \delta) = C - N\frac{C}{N} = (0, 0) \qquad \text{(Expression 7)}$$

In other words, when the strain sensor G1 of the start point node overlaps with the second strain sensor Gn at the nth node, the positions of the first strain sensor G1 and the second strain sensor Gn can be considered to be identical on the relative space. Then, the position of each strain sensor G (position of each node) is corrected on the basis of the calculated position of the second strain sensor Gn determined by sequentially adding the relative positions and the actual position (the position identical to that of the first strain sensor G1). This allows a detection device to be provided that can match the coordinate point of the start point with the coordinate point of the end point.

On the other hand, in the actual space, the start point and the end point may often be misaligned. Accordingly, a method for acquiring the end point coordinate value will now be described.

(Method for Acquiring End Point Coordinate Value in Case Where Start Point and End Point Are Misaligned in Actual Space)

Figure 7:
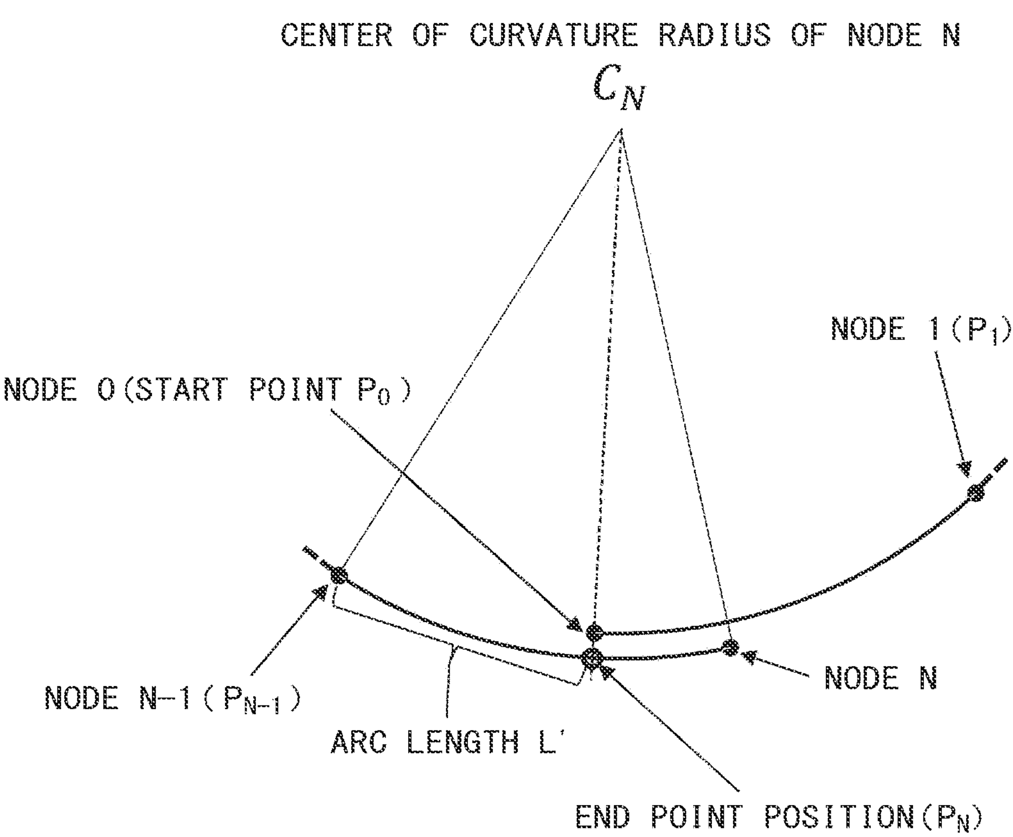
FIG. 7 is a diagram for describing a method for acquiring an end point coordinate value.

In the above description, the start point node and the end point node are assumed to be aligned with each other in the actual space. However, when the entire circumferential length varies among measurement targets, it may be difficult to perfectly match the start point node with the end point node in the actual space. Accordingly, the end point coordinate value is preferably determined by use of the method described below. FIG. 7 is a diagram for describing the method for acquiring the end point coordinate value.

First, a coordinate value $P_0$ of a start point node 0 is present on an arc between a node N−1 and a node N, and any of the measurement methods (FIG. 8, FIG. 9, FIG. 10, and FIG. 11) is used to acquire an arc length L' from the node N to the start point node 0. Here, the use of the arc length L' allows an arc angle from the node N−1 to the end point coordinate value (=start point node) to be expressed as follows.

$$\Phi_{N-1}=(L'/r_{N-1})$$

Therefore, for calculation of a curved surface, the end point coordinate value $P_N$ is determined by the calculation of (Expression 8), and in the correction calculation, $P'_N$ is used as the end point coordinate value.

$$\text{Vector } (C_N P_N)=R(\Phi_{N-1})*\text{vector } (C_N P_{N-1}) \qquad \text{(Expression 8)}$$

(Method 1 for Acquiring Arc Length L' of End Point Coordinate Value)

Figure 8:
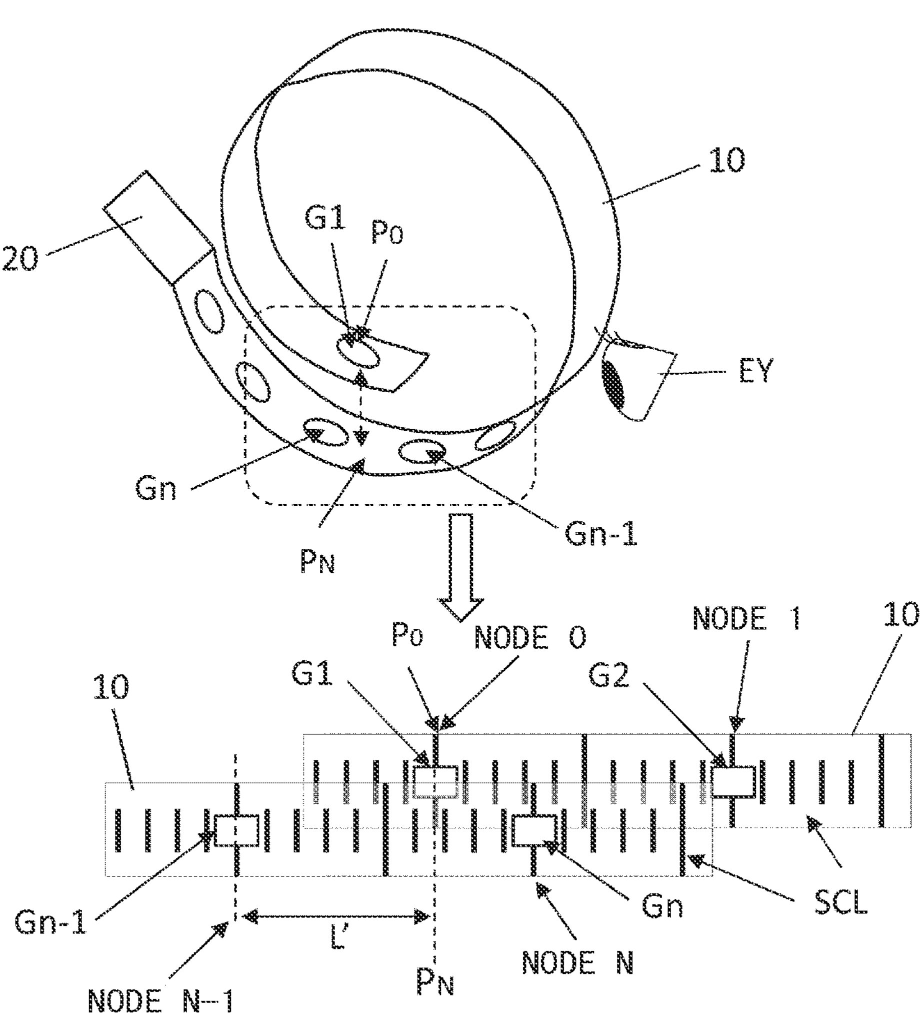
FIG. 8 is a diagram for describing an acquisition method 1 for acquiring an arc length L' of an end point coordinate value $P_N$.

FIG. 8 is a diagram for a method 1 for acquiring the arc length L' of the end point coordinate value $P_N$. In this example, the end point coordinate value (first position) $P_N$ visually close to the start point position $P_0$ of the start point node 0 is acquired. The end point coordinate value $P_N$ can be replaced with a first position. A scale SCL is provided on a front surface side and a back surface side of the flexible substrate 10 to quantitatively evaluate the node position. In other words, the flexible substrate includes a scale for aligning the first strain sensor G1 of the start point node with the second strain sensor Gn located at the nth node. Checking the scale SCL with the eye EY allows acquisition of the arc length L', which is a distance from the node N−1 to the end point coordinate value $P_N$ (=first position: start coordinate value $P_0$ of the start point node 0).

An end side of the flexible substrate 10 is provided with a connection portion 20 for transmitting a signal from each strain sensor G to the arithmetic device PE.

(Method 2 for Acquiring Arc Length L' of End Point Coordinate Position)

Figure 9:
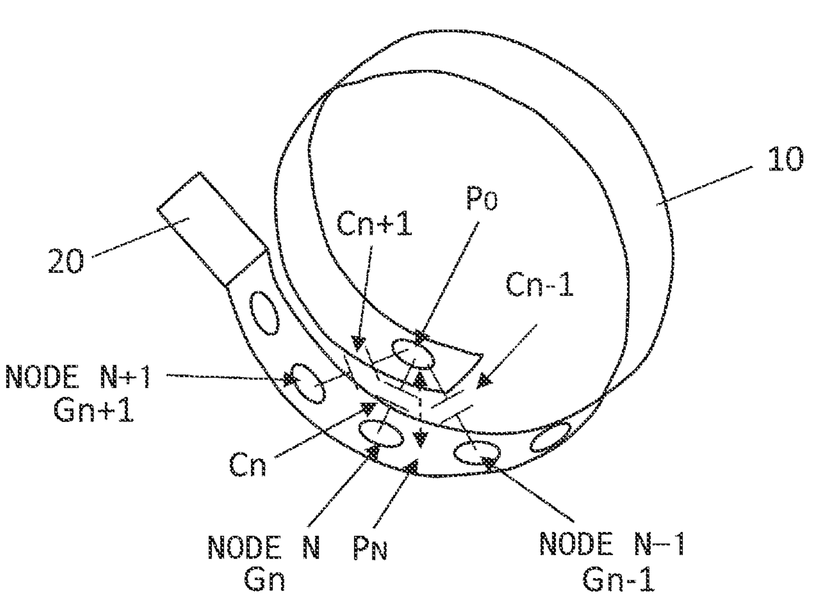
FIG. 9 is a diagram for describing an acquisition method 2 for acquiring the arc length L' of an end point coordinate value.
Figure 10:
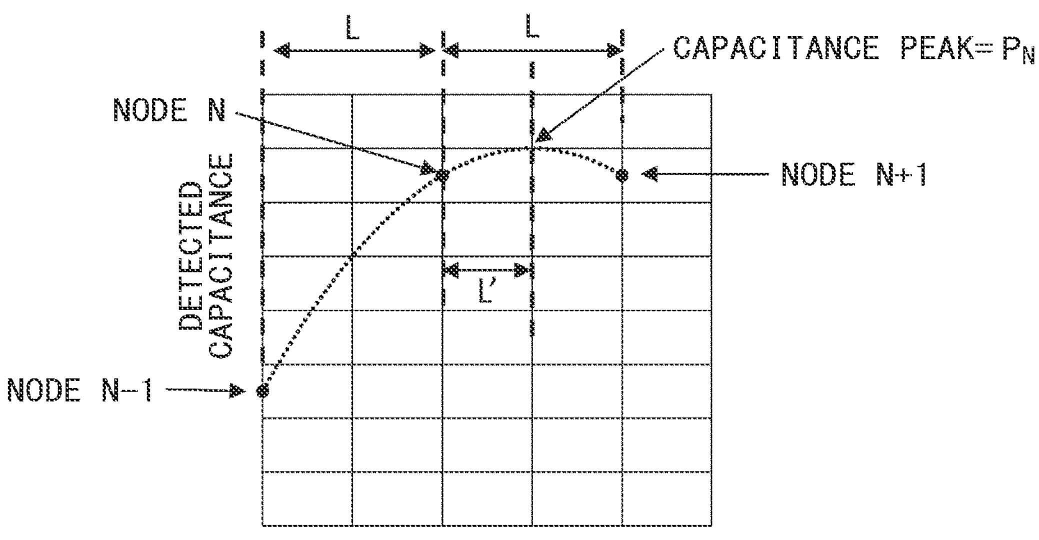
FIG. 10 is a diagram for describing an example in which the end point coordinate value $P_N$ is determined from a detected capacitance at each node.

FIG. 9 is a diagram for describing a method 2 for acquiring the arc length L' of the end point coordinate value. FIG. 10 is a diagram for describing an example in which, at each node, the end point coordinate value $P_N$ is determined from a detected capacitance. In this example, the capacitance of the strain sensor at each node is measured relative to the start point position $P_0$ of the start point node 0, and the end point coordinate value $P_N$ is acquired from a peak coordinate value of the detected capacitance. In this example, an example is illustrated in which the strain sensor Gn−1 of the node N−1, the strain sensor Gn of the node N, and the strain sensor Gn+1 of the node N+1 are used as a plurality of nodes for measuring the capacitance. The number of the plurality of nodes for measuring the capacitance is not limited to this, and any number of nodes may be used as long as the peak value of the capacitance can be measured.

As illustrated in FIG. 10, the detected capacitance of each node (N−1, N, and N+1) is plotted relative to the arc length L, and the coordinate value of the peak capacitance determined by an approximate curve is determined as the end point coordinate value $P_N$. This allows acquisition of the arc length L', which is a distance from the node N−1 to the end point coordinate value $P_N$ (=first position: start coordinate value $P_0$ of the start point node 0).

Note that, in a case where the positions of the strain sensor at the start point and the strain sensor at the end point are misaligned in the actual space, when L' denotes the arc length that is a distance from the node N−1 to the end point coordinate value $P_N$ (=first position: start coordinate value $P_0$ of the start point node 0), the value δ (delta) may be such that $\delta = C/\{(N-1)+(L'/L)\}$.

(Mutual Detection Method)

Figure 11:
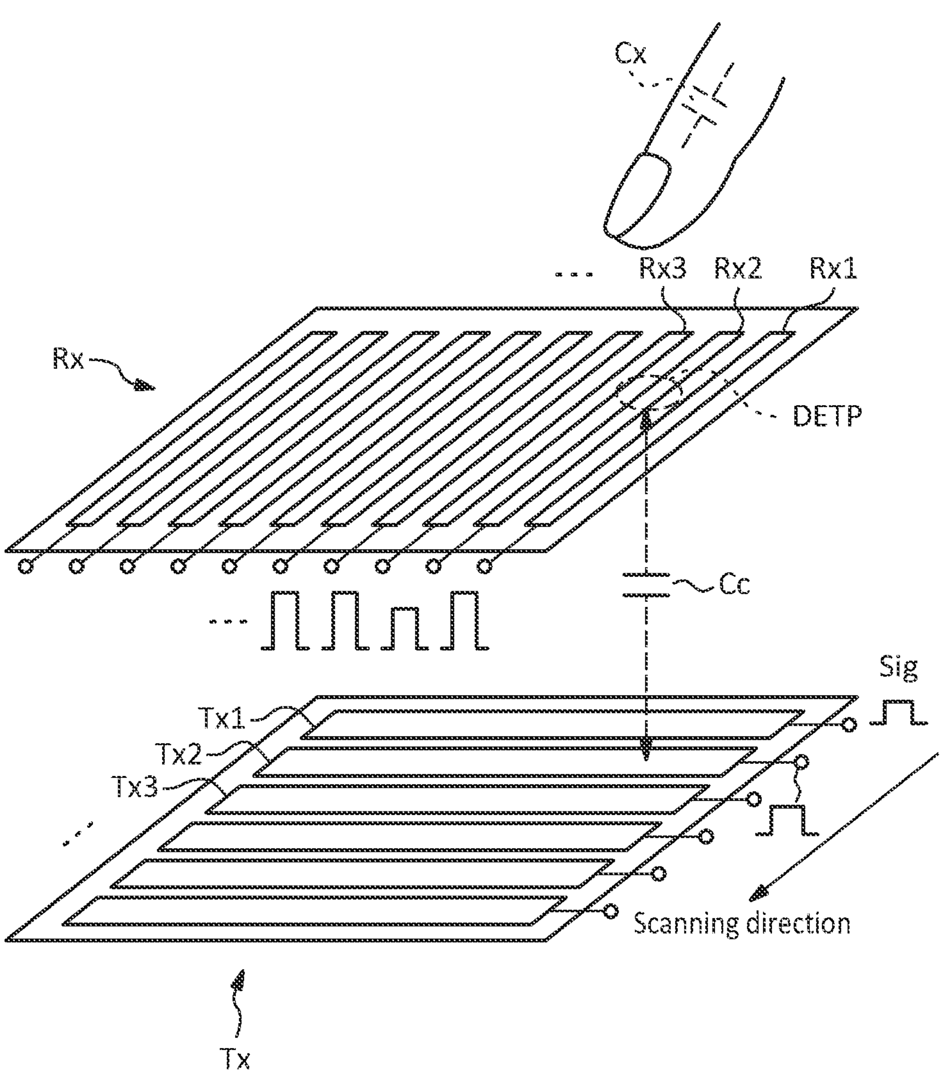
FIG. 11 is a diagram for conceptually describing a method for measuring a capacitance.

FIG. 11 is a diagram for conceptually describing a method for measuring the capacitance. Here, a mutual capacitance method (mutual detection method) is used as a method for measuring the capacitance. In the mutual capacitance method, as illustrated in FIG. 11, the sensor utilized includes a plurality of driving electrodes Tx and a plurality of detection electrodes Rx.

In this example, the plurality of driving electrodes Tx are in a stripe shape. The plurality of driving electrodes Tx (Tx1, Tx2, Tx3, . . . ) are arranged in a scanning (driving) direction (Y direction or X direction). On the other hand, the plurality of detection electrodes Rx include a plurality of detection electrodes (Rx1, Rx2, Rx3, . . . ) (thinner than the driving electrodes). In this example, the plurality of detection electrodes Rx are in a stripe shape. The plurality of detection electrodes Rx (Rx1, Rx2, Rx3, . . . ) are arranged in a direction (X direction or Y direction) being orthogonal to or crossing the plurality of driving electrodes Tx. The plurality of driving electrodes Tx and the plurality of detection electrodes Rx are arranged at intervals. Accordingly, a capacitance Cc is basically present between the plurality of driving electrodes Tx and the plurality of detection electrodes Rx as a capacitance.

During a detection period for the capacitance, a pulsed driving pulse (alternating current signal) is applied to the plurality of driving electrodes Tx. That is, during the detection period, each of the plurality of driving electrodes Tx (Tx1, Tx2, Tx3, . . . ) is scanned by a driving pulse (Sig) with a predetermined period. For example, the finger of the user is assumed to be present close to the crossing portion between the detection electrodes Rx2 and the driving electrodes Tx2. At this time, when the driving pulse (Sig) is supplied to the driving electrode Tx2, a pulsed waveform is obtained at the detection electrodes Rx (Rx1, Rx2, Rx3, . . . ), and from the detection electrode Rx2, a pulse is obtained that has a lower amplitude level than pulses obtained from the other detection electrodes Rx. The plurality of detection electrode Rx (Rx1, Rx2, Rx3, . . . ) monitors fringe electric fields from the plurality of driving electrodes Tx (Tx1, Tx2, Tx3, . . . ), and a conductive object such as the finger approaching the driving electrodes Tx is effective for blocking the fringe electric fields. Blocking the fringe electric fields reduce the detected potentials of the detection electrodes Rx.

The mutual detection method allows the difference in detected potential to be treated as a detected pulse (detected value) for a position DETP. An illustrated capacitance Cc varies between a case where the finger of the user is close to the detection electrodes Rx and a case where the finger of the user is far from the detection electrodes Rx. Accordingly, the level of the detected pulse varies between the case where the finger of the user is close to the detection electrodes Rx and the case where the finger of the user is far from the detection electrodes Rx. Thus, the degree of proximity of the finger to the plane of a touch panel can be determined on the basis of the amplitude level of the detected pulse. The two-dimensional position of the finger on the plane of the touch panel can be detected on the basis of the timing when the driving pulse Sig drives the electrodes and the timing when the detected pulse is output.

This technology is applied, and the driving electrodes Tx are assumed to be the first strain sensor G1, and the detection electrodes Rx are assumed to be the strain sensor Gn−1 of the node N−1, the strain sensor Gn of the node N, and the strain sensor Gn+1 of the node N+1. Then, the capacitance Cn−1, Cn, Cn+1 between the first strain sensor G1 and each strain sensor (Gn−1, Gn, and Gn+1) is detected. In other words, when the capacitance Cn−1, Cn, and Cn+1 between the first strain sensor G1 and each strain sensor (Gn−1, Gn, and Gn+1) is detected, such detection is performed using the mutual capacitance method in which the first strain sensor (Tx) is driven to detect an electric signal from each strain sensor (Rx) (mutual detection). Thus, the method described with reference to FIG. 10 is used to allow the end point coordinate value $P_N$ to be detected and determined from the detected capacitances Cn−1, Cn, and Cn+1. Furthermore, the arc length L' can be acquired, which is a distance from the node N−1 to the end point coordinate value $P_N$.

As described above, in a case where the start point node and the end point node are not perfectly aligned with each other in the actual space, the predetermined position, on the flexible substrate 10, of the strain sensor G1 of the start point node overlaps with the first position on the flexible substrate 10 between the second strain sensor Gn at the nth node and the third strain sensor Gn+1 at the n+1th node, the position of the first strain sensor G1 and the first position (end point coordinate value $P_N$) are considered to be identical on the relative space. Then, the position of each strain sensor G (position of each node) is sequentially corrected on the basis of the difference between the calculated position of the first position determined by adding the relative positions and the actual position (position identical to the first strain sensor G1). Here, the first position is set with use of the scale provided on the flexible substrate 10 (FIG. 8). Alternatively, the first position is determined by detecting the capacitance between the first strain sensor G1 and each strain sensor (FIG. 9 to FIG. 11).

(Flowchart of Curved Surface Reconstruction Calculation Method)

Figure 12:
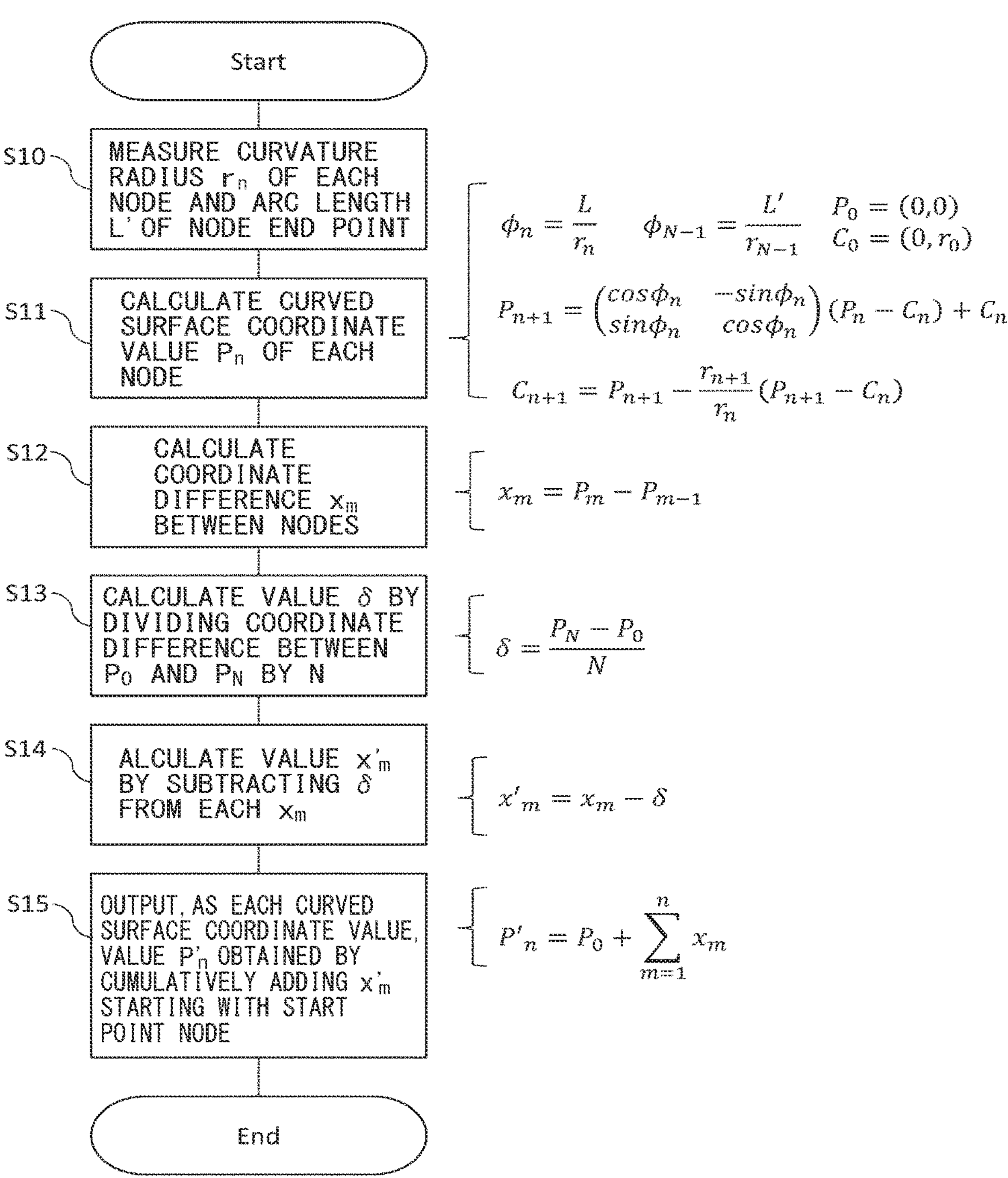
FIG. 12 is a flowchart illustrating a curved surface reconstruction method according to the curvature radius.

Now, a flowchart of the curved surface reconstruction calculation method according to the embodiment will be described with reference to FIG. 12. FIG. 12 is a flowchart illustrating the curved surface reconstruction calculation method according to the curvature radius. FIG. 12 corresponds to a collective description of the curved surface reconstruction calculation methods 1 and 2 described above, and Expressions related to steps S10 to S15 are depicted on the sides of the steps. To avoid duplication, each step will be described below in brief.

Step S10: The curvature radius $r_n$ of each node and the arc length L' of the node end point are measured.

Step S11: The curved surface coordinate value $P_n$ of each node is calculated.

Step S12: The coordinate difference $x_m$ between the nodes is calculated.

Step S13: The value δ is calculated by dividing, by N, the coordinate difference between the start point position $P_0$ of the start point node 0 and the end point coordinate value (first position) $P_N$.

Step S14: The value $x'_m$ is calculated by subtracting δ from each coordinate difference $X_m$.

Step S15: The value $P'_n$ obtained by accumulatively adding $x'_m$ starting with the start point node is output as each curved surface coordinate value.

As described above, a detection device can be provided that can match the coordinate point of the start point with the coordinate point of the end point.

(Sensor Array Sheet of One-Sided Strain Gauges)

Figure 13:
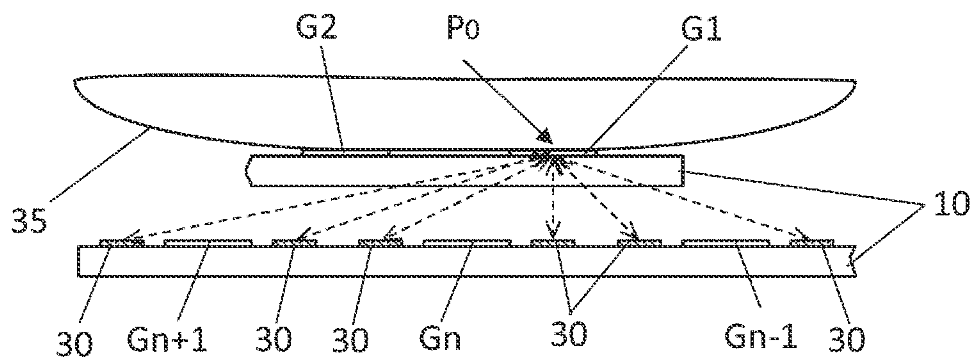
FIG. 13 is a diagram for describing a case where the capacitance is detected with use of electrodes for capacitance measurement disposed on a flexible substrate.
Figure 14:
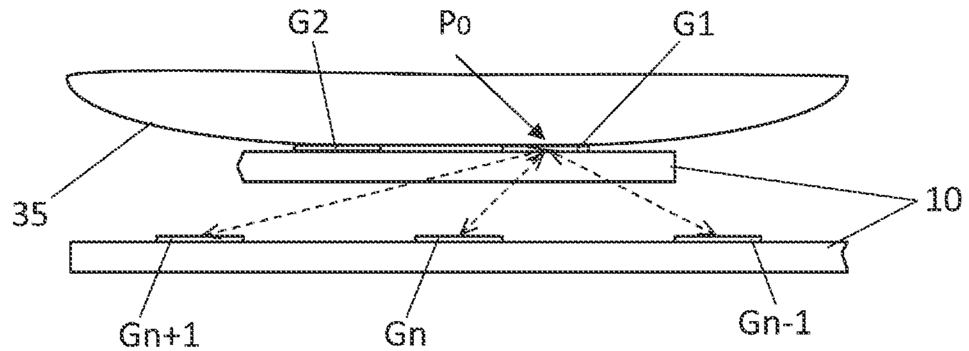
FIG. 14 is a diagram for describing a case where the capacitance is detected with use of each strain gauge.

Now, FIGS. 13 and 14 are used to describe a method for detecting the capacitance in a case where a plurality of strain gauges G are provided on only one of the front and back surface sides of the flexible substrate 10 (this configuration is referred to as a sensor array sheet 1 of one-sided strain gauges). FIG. 13 is a diagram for describing a case where the capacitance is detected with use of electrodes for capacitance measurement disposed on the flexible substrate. FIG. 14 is a diagram for describing a case where the capacitance is detected with use of each strain gauge. In FIGS. 13 and 14, 35 is a curved surface to be measured, and the flexible substrate 10 is provided along the curved surface to be measured 35.

As illustrated in FIG. 13, the plurality of strain gauges G (G1, G2, . . . , Gn−1, Gn, and Gn+1) are disposed on the front surface side of the flexible substrate 10, and a plurality of electrodes for capacitance measurement (also referred to as capacitance detecting electrodes) 30 are disposed on the front surface side of the flexible substrate 10 between the strain gauges (Gn−1, Gn, and Gn+1) in such a manner that one strain gauge is sandwiched between two electrodes for capacitance measurement 30. Here, the driving electrodes Tx are defined as the first strain gauge G1, and the detection electrodes Rx are defined as the plurality of electrodes for capacitance measurement 30, and the mutual capacitance method is used to measure the mutual capacitance (capacitance value) between the first strain gauge G1 and the plurality of electrodes for capacitance measurement 30. This configuration allows the end point coordinate value $P_N$ to be detected and determined from the values of the measured capacitances. Furthermore, the arc length L' can be acquired, which is a distance from the node N−1 to the end point coordinate value $P_N$.

As illustrated in FIG. 14, the plurality of strain gauges G (G1, G2, . . . , Gn−1, Gn, and Gn+1) is disposed on the front surface side of the flexible substrate 10. Here, the driving electrodes Tx are defined as the first strain gauge G1, and the detection electrodes Rx are defined as the strain gauges Gn−1, Gn, and Gn+1, and the mutual capacitance method is used to measure the mutual capacitance (capacitance value) between the first strain gauge G1 and the strain gauges Gn−1, Gn, and Gn+1. This configuration allows the end point coordinate value $P_N$ to be detected and determined from the values of the measured capacitances. Furthermore, the arc length L' can be acquired, which is a distance from the node N−1 to the end point coordinate value $P_N$.

(Sensor Array Sheet of Double-Sided Strain Gauges)

Figure 15:
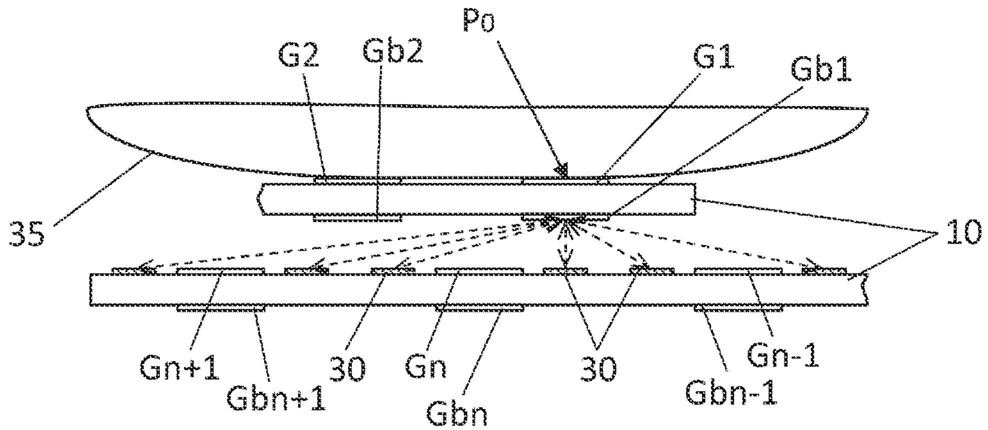
FIG. 15 is a diagram for a describing a case where the capacitance is detected with use of the electrodes for capacitance measurement disposed on the flexible substrate.
Figure 16:
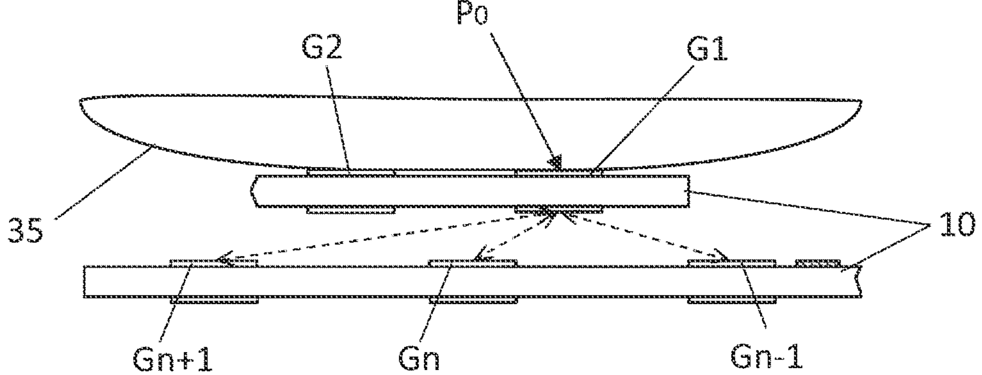
FIG. 16 is a diagram for describing a case where the capacitance is detected with use of each strain gauge.

Now, FIGS. 15 and 16 are used to describe a method for detecting the capacitance in a case where a plurality of strain gauges G is provided on both the front and back surface sides of the flexible substrate 10 (this configuration is referred to as a sensor array sheet 1 of double-sided strain gauges). FIG. 15 is a diagram for describing a case where the capacitance is detected with use of electrodes for capacitance measurement disposed on the flexible substrate. FIG. 16 is a diagram for describing a case where the capacitance is detected with use of each strain gauge. In FIGS. 15 and 16, 35 is a curved surface to be measured, and the flexible substrate 10 is provided along the curved surface to be measured 35.

As illustrated in FIG. 15, the plurality of strain gauges G (G1, G2, . . . , Gn−1, Gn, and Gn+1) are disposed on the front surface side of the flexible substrate 10, and a plurality of strain gauges G (Gb1, Gb2, . . . , Gbn−1, Gbn, and Gbn+1) are disposed on the back surface side of the flexible substrate 10. Furthermore, the plurality of electrodes for capacitance measurement 30 are disposed on the front surface side of the flexible substrate 10 between the strain gauges (Gn−1, Gn, and Gn+1) in such a manner that one strain gauge is sandwiched between two electrodes for capacitance measurement 30. Here, the driving electrodes Tx are defined as the strain gauge Gb1 on the outer side of the curved surface (back surface side of the flexible substrate 10) of the first strain gauge G1, and the detection electrodes Rx are defined as the plurality of electrodes for capacitance measurement 30, and the mutual capacitance method is used to measure the mutual capacitance (capacitance value) between the strain gauge Gb1 and the plurality of electrodes for capacitance measurement 30. This configuration allows the end point coordinate value $P_N$ to be detected and determined from the values of the measured capacitances. Furthermore, the arc length L' can be acquired, which is a distance from the node N−1 to the end point coordinate value $P_N$.

As illustrated in FIG. 16, the plurality of strain gauges G (G1, G2, . . . , Gn−1, Gn, and Gn+1) are disposed on the front surface side of the flexible substrate 10, and the plurality of strain gauges G (Gb1, Gb2, . . . , Gbn−1, Gbn, and Gbn+1) are disposed on the back surface side of the flexible substrate 10. Here, the driving electrodes Tx are defined as the strain gauge Gb1 on the outer side of the curved surface (back surface side of the flexible substrate 10) of the first strain gauge G1, and the detection electrodes Rx are defined as the strain gauges Gn−1, Gn, and Gn+1, and the mutual capacitance method is used to measure the mutual capacitance (capacitance value) between the first strain gauge G1 and the strain gauges Gn−1, Gn, and Gn+1. Note that the strain gauges on each side that are not used to measure the capacitance may be connected to, for example, a ground potential GND (0 V).

Figure 17:
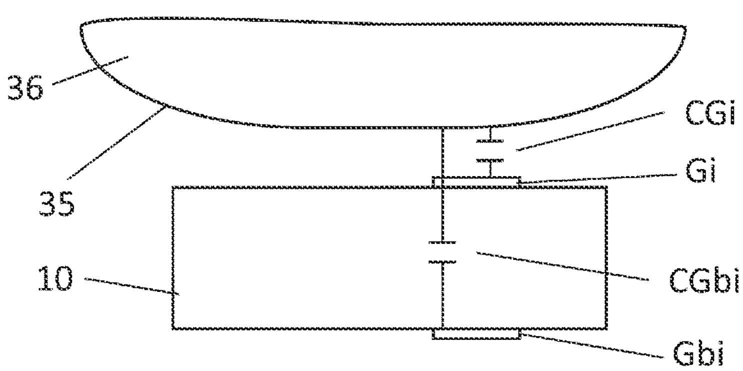
FIG. 17 is a diagram for describing a method of determining an inner side of a curved surface to be measured and an outer side of the curved surface to be measured, in a sensor array sheet of double-sided strain gauges.
Figure 18:
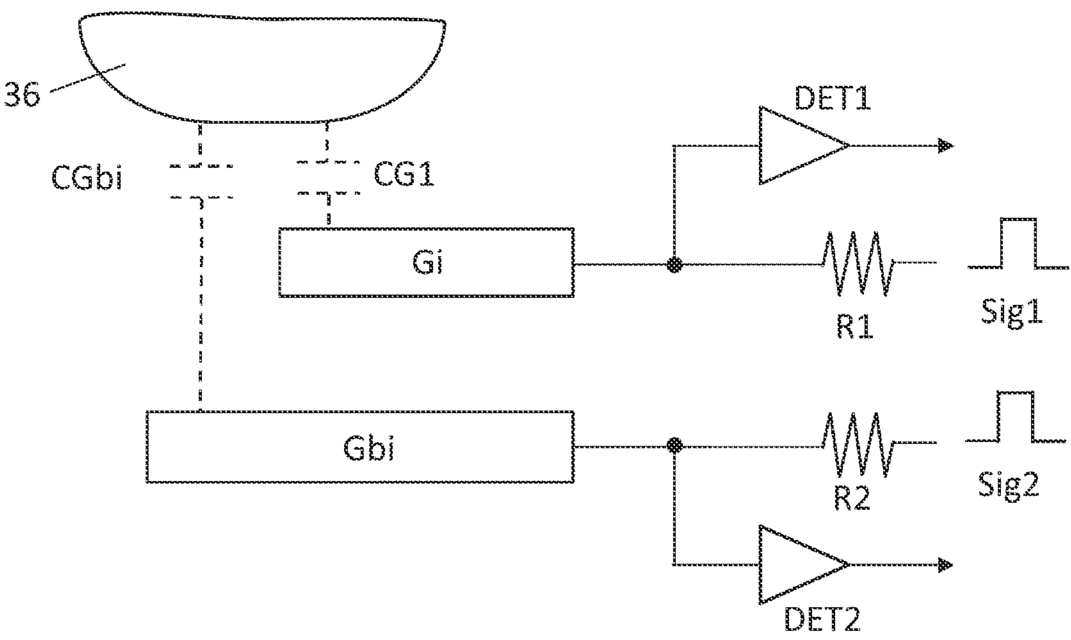
FIG. 18 is a diagram for describing a self capacitance detection method.

FIG. 17 is a diagram for describing a method for measuring an inner side of a curved surface to be measured and an outer side of the curved surface to be measured in the sensor array sheet of the double-sided strain gauges. FIG. 18 is a diagram for describing a self capacitance detection method.

In a case where the sensor array sheet 1 of the double-sided strain gauges is used to measure the shape of the curved surface to be measured 35, it is necessary to determine which of the strain gauges is installed on the inner side of the curved surface to be measured 35 (near the curved surface 35) and which of the strain gauges is installed on the outer side of the curved surface to be measured 35 (away from the curved surface 35). Accordingly, as illustrated in FIG. 17, the capacitance values of self capacitances CGi and CGbi are measured for the strain gauges Gi and Gbi on the front surface and the back surface of the flexible substrate 10. On the basis of capacitive coupling to a curved surface to be measured 36, a surface with a larger self capacitance CGi or CGbi indicated by measurement results is determined to be the inner surface (in the sensor array sheet 1, the surface opposing the measurement target 36: front surface side). A surface with a smaller self capacitance CGi or CGbi indicated by the measurement results is determined to be the outer surface (in the sensor array sheet 1, the surface opposing the surface opposing the measurement target 36: back surface side).

(Self Detection Method)

As illustrated in FIG. 18, the measurement of the self capacitance can be detected by a self capacitance detection method (self detection method). In the self capacitance detection method, the strain gauges Gi and Gbi are driven by self detection driving pulses (alternating current signals) Sig1 and Sig2 via predetermined impedances R1 and R2, and the capacitances of the measurement target 36 and the strain gauges Gi and Gbi are charged by the self detection driving pulses Sig1 and Sig2. Then, the magnitudes of capacitance values of the self capacitances CGi and CGbi can be measured by use of detection circuits DET1 and DET2 to detect the capacitance values of capacitances of the strain gauges Gi and Gbi charged by the self detection driving pulses Sig1 and Sig2.

Although not illustrated in FIGS. 11 and 18, a configuration may be provided in which a switch or the like is used to switch between the mutual detection method and the self detection method. Additionally, the configuration of the self detection method illustrated in FIG. 18 is illustrative, and the present disclosure is not limited to this configuration. The arithmetic device PE can include a circuit configuration that can implement the mutual detection method and a circuit configuration that can implement the self detection method.

The scope of the present disclosure includes all the detection devices that may be implemented by those skilled in the art by appropriately designing and varying each embodiment of the present disclosure on the basis of the detection device described above as the embodiment of the present disclosure as long as the detection devices include the spirits of the present disclosure.

In the scope of concepts of the present disclosure, those skilled in the art may devise many variations and modifications, and it is comprehended that such variations and modifications belong to the scope of the present disclosure. For example, the scope of the present disclosure also includes each of the above-described embodiments on which those skilled in the art appropriately perform addition or deletion of a component or change of the design, or addition or omission of a step or change of a condition as long as such an embodiment includes the spirits of the present disclosure.

Additionally, it is comprehended that the present disclosure, as a matter of course, produces other effects made by the aspects described in the present embodiments and which are clear from the description of the specification or which are appropriately devised by those skilled in the art.

Various disclosures can be formed by appropriately combining a plurality of components disclosed in the embodiments described above. For example, some components may be deleted from all the components described in the embodiments. Furthermore, components of different embodiments may appropriately be used in combination.

What is claimed is:

1. A detection device comprising:

a sensor substrate including a plurality of strain sensors arranged on a rectangular flexible substrate at fixed intervals in a longitudinal direction of the flexible substrate, wherein each of the strain sensors are configured to be selectively connected to a processor device to allow detection of a respective value corresponding to a relative position of a respective strain sensor, and the processor is configured to determine a curvature radius between a pair of adjacent strain sensors among the plurality of strain sensors on a basis of a value from a preceding strain sensor of the pair of adjacent sensors, a start point node being defined as a position of a first strain sensor at one end of the plurality of strain sensors, the processor is configured to determine a relative position of each of the plurality of strain sensors by sequentially adding the relative positions, starting with the first strain sensor of the start point node on a basis of the curvature radius between adjacent strain sensors, the sensor substrate is configured such that the first strain sensor of the start point node is configured to overlap with a second strain sensor at an nth node, such that a position of the first strain sensor and a position of the second strain sensor are considered to be identical on a relative space, and the processor is configured to correct a position of each strain sensor on a basis of a difference between a calculated position of the second strain sensor determined by sequentially adding the relative positions and an actual position of the second strain sensor.

2. The detection device according to claim 1, wherein the processor is configured to perform correction by dividing a value of a difference between the calculated position of the second strain sensor and an actual position of the second strain sensor by the number of arcs between the first strain sensor and the second strain sensor, and subtracting, from each node, a value resulting from the division.

3. The detection device according to claim 1, wherein the flexible substrate has a scale for alignment between the first strain sensor and the second strain sensor.

4. The detection device according to claim 1, further comprising a select circuit connected to each of the strain sensors and the processor device, wherein the select circuit is configured to control each one of the strain sensors to selectively connect to the processor device to determine the difference.

5. A detection device comprising:

a sensor substrate including a plurality of strain sensors arranged on a rectangular flexible substrate at fixed intervals in a longitudinal direction of the flexible substrate, wherein each of the strain sensors are configured to be selectively connected to a processor device to allow detection of a respective value corresponding to a relative position of a respective strain sensor, and the processor is configured to determine a curvature radius between each pair of adjacent strain sensors among the plurality of strain sensors on a basis of a value from a preceding strain sensor of the pair of adjacent strain sensors, a start point node being defined as a position of a first strain sensor at one end of the plurality of strain sensors, the processor is configured to determine a relative position of each of the plurality of strain sensors by sequentially adding the relative positions, starting with the first strain sensor of the start point node on a basis of the curvature radius between adjacent strain sensors, the sensor substrate is configured such that a predetermined position, on the flexible substrate, of the first strain sensor of the start point node is configured to overlap with a first position on the flexible substrate between a second strain sensor at an nth node and a third strain sensor at an n+1th node, such that a position of the first strain sensor and the first position are considered to be identical on a relative space, and the processor is configured to correct a position of each strain sensor on a basis of a difference between a calculated position of the first position determined by sequentially adding the relative positions and an actual position of the first position.

6. The detection device according to claim 5, wherein the processor is configured to perform correction by dividing a value of a difference between a calculated position of the first position and an actual position of the first position by the number of arcs between the first strain sensor and the second strain sensor, subtracting, from each node, a value resulting from the division, and calculating the position of the second strain sensor.

7. The detection device according to claim 5, wherein the first position is configured to be set by a scale provided on the flexible substrate.

8. The detection device according to claim 5, wherein the first position is configured to be determined by detecting a capacitance between the first strain sensor and each strain sensor.

9. The detection device according to claim 8, wherein the capacitance between the first strain sensor and each strain sensor is configured to be detected by the processor with use of a mutual capacitance method in which the first strain sensor is driven to detect an electric signal from each strain sensor.

10. The detection device according to claim 5, wherein the first position is configured to be determined by detecting a capacitance between a plurality of capacitance detection electrodes each disposed between the first strain sensor and a corresponding strain sensor.

11. The detection device according to claim 10, wherein a capacitance between the first strain sensor and each capacitance detection electrode is configured to be detected using a mutual capacitance method in which the first strain sensor is driven to detect an electric signal from each capacitance detection electrode.

12. The detection device according to claim 5, wherein the plurality of strain gauges are disposed on both surfaces of the flexible substrate.

13. The detection device according to claim 12, wherein capacitance values of the strain gauges disposed on both surfaces of the flexible substrate are configured to be detected by the processor by self capacitance detection, and the first strain sensor on a surface with a small capacitance value and the second strain sensor on a surface with a large capacitance value are detected.

14. The detection device according to claim 5, further comprising a select circuit connected to each of the strain sensors and the processor device, wherein the select circuit is configured to control each one of the strain sensors to selectively connect to the processor device to determine the difference.

* * * * *